United States Patent [19]
Kitamura et al.

[11] Patent Number: 5,093,591
[45] Date of Patent: Mar. 3, 1992

[54] ALTERNATING CURRENT GENERATOR WITH VENTED FAN-LIKE PULLEYS

[75] Inventors: Yutaka Kitamura; Tadashi Katashima; Keiichi Komurasaki; Tsuyoshi Yano, all of Himeji, Japan

[73] Assignee: Mitsubishi Denki Kabushiki Kaisha, Tokyo, Japan

[21] Appl. No.: 480,196

[22] Filed: Feb. 14, 1990

[30] Foreign Application Priority Data

Feb. 15, 1989 [JP] Japan ................... 1-35435

[51] Int. Cl.⁵ ................... H02K 9/06; H02K 11/00
[52] U.S. Cl. ................... 310/62; 310/68 D
[58] Field of Search ................... 310/68 D, 58, 62, 63

[56] References Cited

U.S. PATENT DOCUMENTS

| | | | |
|---|---|---|---|
| 1,998,087 | 4/1935 | Koch, Jr. | 310/62 |
| 2,057,196 | 10/1936 | Koch, Jr. | 310/63 |
| 3,175,109 | 6/1961 | Stone | 310/62 |
| 4,184,804 | 1/1980 | Inagaki et al. | 310/62 |
| 4,476,405 | 10/1984 | Komurasaki | 310/68 D |
| 4,604,538 | 8/1986 | Merrill et al. | 310/68 D |
| 4,612,419 | 7/1979 | DeAngelis | 310/62 |
| 4,952,828 | 8/1990 | Yu-Fang et al. | 310/68 D |

Primary Examiner—Steven L. Stephan
Assistant Examiner—Dennis R. Haszko
Attorney, Agent, or Firm—Sughrue, Mion, Zinn, Macpeak and Seas

[57] ABSTRACT

An alternating current generator with a pulley (17) for transmitting driving force from an engine to a rotor and/or to an auxiliary machine, having an external axial fan (18), rotating unitedly with the pulley (17), for drawing external air into the inside of the AC generator through air intake holes provided on both covers of the AC generator housing. The pulley (17) has air-intake vents (17a) axially extending through the pulley to permit relatively cold air to pass therethrough. At each such vent (17a), a guide member (17b) between the blades of the external axial fan (18) and the air intake holes directs the relatively cold air drawn in by the axial fan, to cool the interior components of the AC generator. The guide members (17b) further serve to shut out the outside air that has been heated from having passed near the outer surface of the housing.

11 Claims, 9 Drawing Sheets

FIG. I
Prior Art

ALTERNATING CURRENT GENERATOR WITH VENTED FAN-LIKE PULLEYS

BACKGROUND OF THE INVENTION

1. Field of the Invention

This invention relates to an alternating current generator used for a vehicle or the like.

2. Description of Related Art

FIG. 1 is a sectional view showing the construction of a conventional alternating current generator for a vehicle. In the figure, reference numerals 1 and 2 indicate first and second bowl-shaped housing covers arranged with concave sides facing each other, and serving to house the main part of the alternating current generator. The second cover 2 corresponds to the rear side of the AC generator and has a deeper bowl than the first housing cover 1, which corresponds to the front side of the generator. The first and second covers 1 and 2 house a stator 3 with a ring shaped stator core 3a around which is wound a stator coil along the outer periphery thereof. The first and second covers 1, 2 are tightened by a bolt 19.

At the positions corresponding to the respective bowl bottoms of the first and second covers 1, 2, (i.e., in the axial center of the front and rear sides of the generator), circular bearing boxes 1a and 2a are respectively provided. Bearings 4 and 5 are respectively fitted into the bearing boxes 1a and 2a. The bearings 4 and 5, rotatably support the shaft 6.

A set of pole cores 7 and 8 having opposite polarity are fixed around the shaft 6. Pole cores 7, 8 each have a plurality of axially-projecting wedge-shaped magnetic pole pieces circumferentially formed around discs that are coaxially fixed to shaft 6. The pole pieces of the respective pole cores 7 and 8 are arranged so as to interlace each other. That is, the pole pieces of pole core 7 alternately interface with the pole pieces of pole core 8. An excitation coil 9 is fixed around the shaft 6 between the pole cores 7 and 8. In order to draw external air into the inside of the generator housing, internal fans 10a, 10b which rotate unitedly with the shaft 6 are respectively attached on the front and rear surfaces of pole covers 7 and 8, with the fan blade tips flaring outward from the pole cores. Along the rear portion of shaft 6, at the second cover 2 side, two slip rings 12 made of a metallic conduit are fitted, but are insulated from the shaft 6. A rotor 11 is made up of the shaft 6, pole cores 7, 8, exciting coil 9, fans 10a, 10b, and slip rings 12. The rotor 11 is provided inside the inner peripheral of the aforementioned stator 3.

Inside of the second cover 2, there is housed an electric current supplying unit 13 with brushes 13a, which are slidably connected to the slip rings 12, respectively, for giving exciting current to the exciting coil 9, a rectifier for rectifying induced alternating current by the stator coil 3b into direct current, and a voltage regulator 15 for detecting direct current to control the exciting current to the excitation coil 9 to regulate the output voltage to the battery to a constant level.

On the first cover 1, there are provided at least one inlet hole 101 for drawing outside air to the inside by the rotation of the fan 10a, and at least one discharge hole 102 for discharging the air which has circulated through the inside. On the second cover 2 housing the rectifier 14 and the electric current supplying unit 13, there are provided at least one inlet hole 201 for drawing outside air to the inside by the rotation of the fan 10b, and at least one discharge hole 202 for discharging the air which has passed through the inside.

Around the end of the shaft 6 on the first cover 1 side, in the vicinity of the outer surface of the cover 1 is fixed a single groove pulley 16 which transmits the rotational power of an engine to the shaft 6. Around the end portion of the shaft 6 on the second cover 2 side, in the vicinity of the outer side surface of the second cover 2, is fixed a single-groove pulley 17 which transmits this rotational power to an auxiliary machine. The outer peripheral edge of the pulley 17 reaches the position corresponding to the inlet holes(s) 201 of the second cover 2.

Explanation will be given on how the conventional alternating current generator of the above construction operates to cool the inside thereof. The rotation of the engine is transmitted through the pulley 16 to rotate the shaft 6. When the shaft 6 rotates, the internal fans 10a, 10b fixed on both outer surfaces of the rotor 11 rotate. By the rotation of the fans 10a, 10b, relatively cold outside air is drawn in through both first and second covers (1 and 2) via the inlet holes (101, 201, respectively), to the inside. The air then passes through the inside as shown by the arrows a and b in the figure cooling the generator components as it circulates therethrough.

The drawn air shown by the arrow a is discharged from the discharge hole 102 after cooling the bearing 4, pole core 7, excitation coil 9, and stator coil 3b. The drawn air shown by the arrow b is discharged through the discharge hole 202 after cooling the voltage regulator 15 and the rectifier 14, and further, the pole core 8, excitation coil 9, and stator coil 3b.

Since the outer peripheral edge of the pulley 17 reaches the radial position corresponding to the inlet hole 201, however, the outside air drawn into the inlet hole 201 is that outside air which had circulated along the outer surface of the second cover 2 as indicated by an arrow b' in the figure. As the temperature of the second cover 2 becomes higher by the heat generated inside, the temperature of the air circulating along the outer surface of the second cover 2 rises by receiving the heat from the second cover 2, thereby resulting in high temperature air being drawn into the inlet hole 201.

Accordingly, a problem arises in sufficiently cooling such components as the rectifier 14 and the voltage regulator 15 by such high temperature air.

SUMMARY OF THE INVENTION

The present invention has been devised to solve the problem mentioned above.

The primary object of the invention is to provide an alternating current generator wherein the air drawn for cooling the inside comes from a region outside the generator that has not been heated by the hot outer surface of the generator and is therefore cool enough to be capable of sufficiently cooling the inside thereof.

Another object of the invention is to provide an alternating current generator which allows a continuous flow of air through and around those generator parts to be cooled. Such a continuous air flow ensures that the cold air that is drawn to the inside is not prematurely heated due to mixing with that air already inside that has become hot by having come into contact with those generator components being cooled. By preventing the already hot air from mixing with the incoming cold air via proper expulsion of the heated air, effective cooling of the generator is promoted.

The above and further objects and features of the invention will more fully be apparent from the following detailed description with accompanying drawings.

DESCRIPTION OF THE PREFERRED EMBODIMENTS

Figure 1:
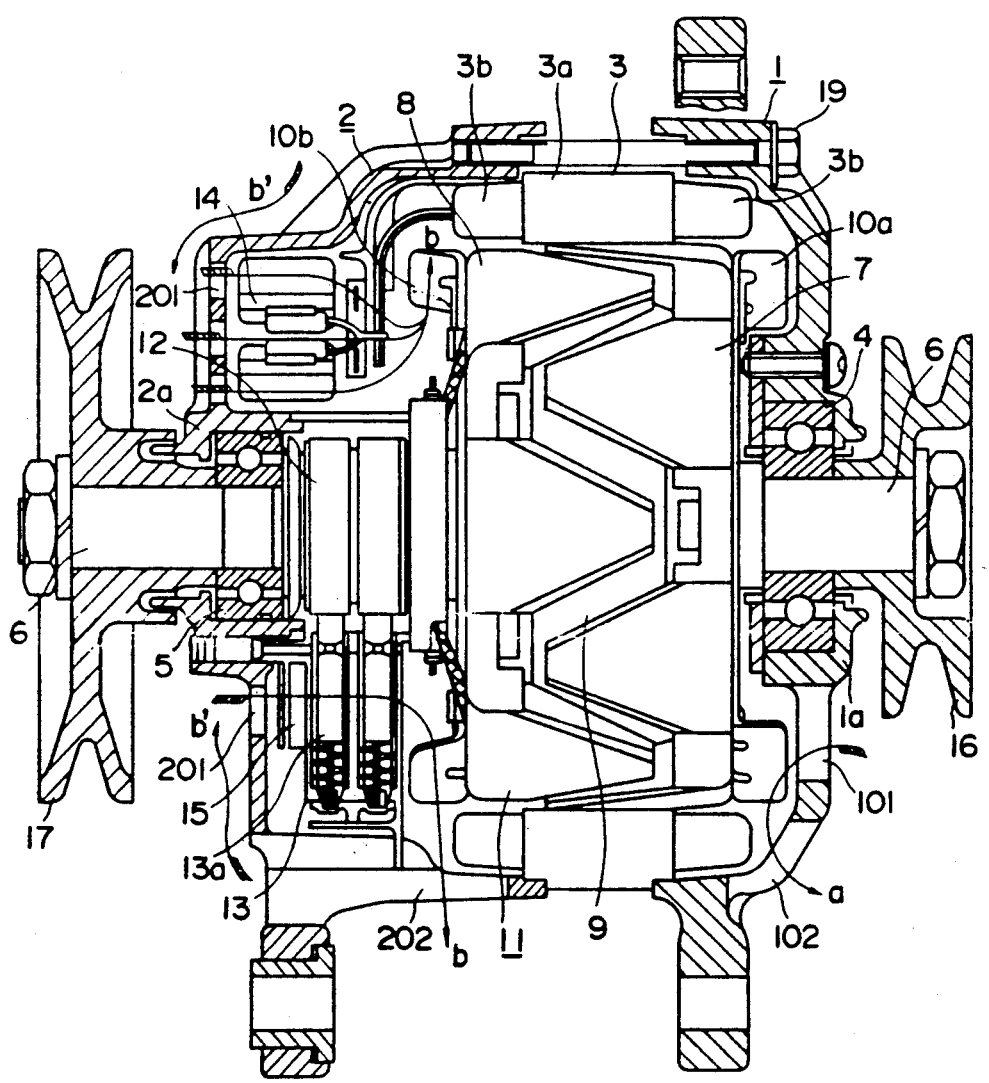
FIG. 1 is a sectional view showing the construction of a conventional alternating current generator.

In the following, explanation will be given on the alternating current generator of the present invention by referring to the drawings.

Figure 2:
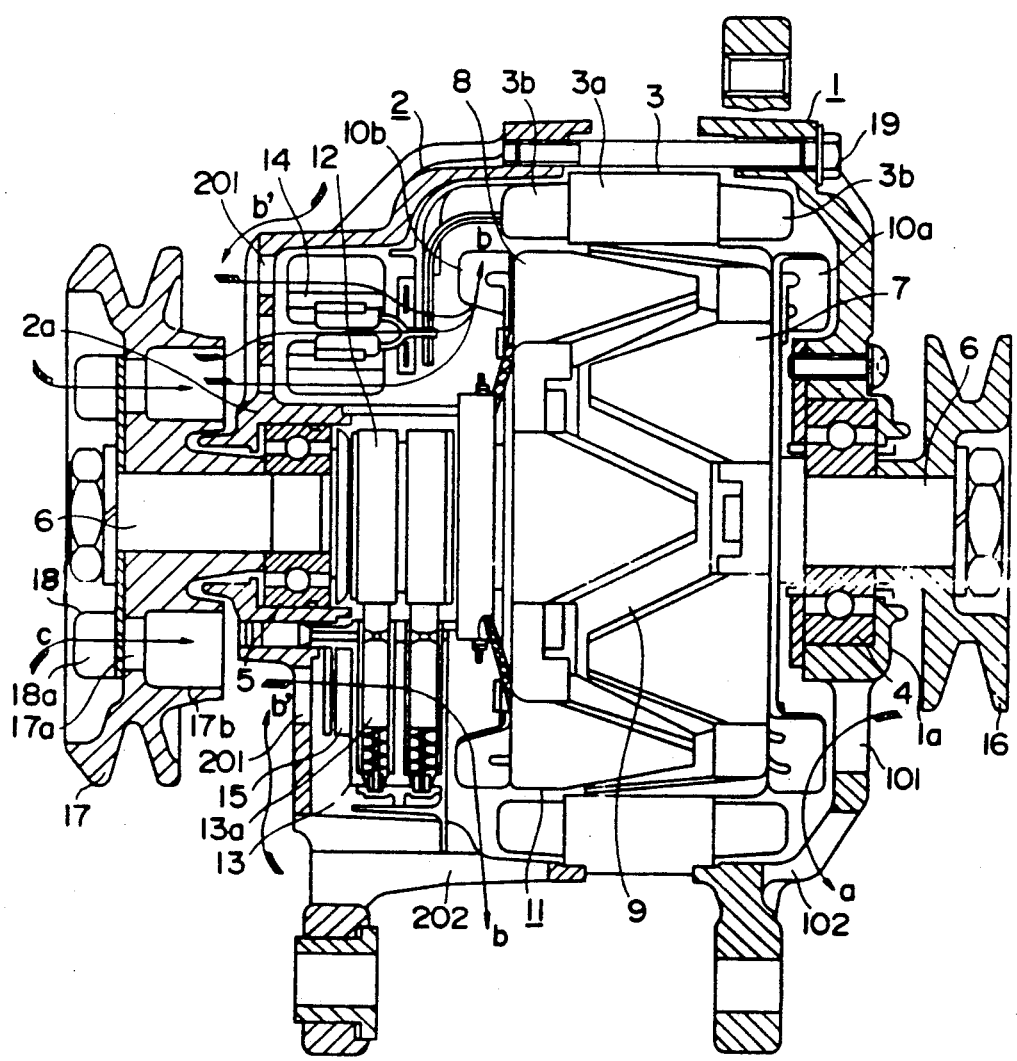
FIG. 2 is a sectional view showing the construction of one embodiment of an alternating current generator according to the present invention.

FIG. 2 is a sectional view showing the construction of one embodiment of an alternating current generator of the invention. In the figure, reference numerals 1 and 2 indicate first and second bowl-shaped housing covers arranged with concave sides facing each other, and serving to house the main part of the alternating current generator. The second cover 2 corresponds to the rear side of the generator and has a deeper bowl than the first cover 1, which corresponds to the front side of the generator. The first and second covers 1 and 2 house a stator 3 with a ring-shaped stator core 3a around which is wound a stator coil along the outer periphery thereof. The first and second covers 1, 2 are tightened by a bolt 19.

At the positions corresponding to the respective bowl bottoms of the first and second covers 1, 2, circular bearing boxes 1a and 2a are respectively provided. Bearings 4 and 5 are respectively fitted into the bearing boxes 1a and 2a. The bearings 4 and 5 rotatably support the shaft 6.

A set of pole cores 7 and 8 having opposite polarity are fixed around the shaft 6. Pole cores 7 and 8 each have a plurality of axially-projecting wedge-shaped magnetic pole pieces formed around discs that are coaxially-fixed to shaft 6. The pole pieces of the respective pole cores 7 and 8 are arranged so as to interlace each other; that is, the pole pieces of pole core 7 alternately interlace with the pole pieces of pole core 8. An excitation coil 9 is fixed around the shaft 6 between the pole cores 7 and 8. Internal fans 10a and 10b which rotate unitedly with the shaft 6 are respectively attached on the front and rear surfaces of pole cores 7 and 8 with the fan blade tips flaring outward from the pole cores. Along the rear portion of shaft 6 at the second cover 2 side, two slip rings 12 made of a metallic conduit are fitted, but are insulated from the shaft 6. A rotor 11 is made up of the shaft 6, pole cores 7 and 8 excitation coil 9, internal fans 10a and 10b and slip rings 12. The rotor 11 is provided inside the inner peripheral of the aforementioned stator 3.

Inside of the second cover 2, there is housed an electric current supplying unit 13 with brushes 13a which are slidably connected to the slip rings 12, respectively, for giving excitation current to the excitation coil 9, a rectifier for rectifying induced alternating current by the stator coil 3b into direct current, and a voltage regulator 15 for detecting direct current to control the excitation current to the excitation coil 9 to regulate the output voltage to the battery to a constant level.

On the first cover 1, there are provided at least one inlet hole 101 for drawing outside air to the inside by the rotation of the internal fan 10a, and at least one discharge hole 102 for discharging the air which has circulated through the inside. On the second cover 2 housing the rectifier 14 and the electric current supplying unit 13, there are provided at least one inlet hole 201 for drawing outside air to the inside by the rotation of the internal fan 10b, and at least one discharge hole 202 for discharging the heated air which has passed through the inside.

Around the end of the shaft 6 on the first cover 1 side, in the vicinity of the outer surface of the cover 1 is fixed a single groove pulley 16 which transmits the rotational power of an engine to the shaft 6. Around the end portion of the shaft 6 on the second cover 2 side, in the vicinity of the outer side surface of the second cover 2, is fixed a single-groove pulley 17 which transmits this rotational power to an auxiliary machine. The outer peripheral edge of the pulley 17 reaches the position corresponding to the inlet hole 201 of the second cover 2.

Four air intake vents 17a axially extend through the pulley 17 to permit relatively cool air to pass directly through the pulley and be subsequently drawn, by action of internal fan 10b, through inlet hole 201 into the inside of the generator.

Figure 3:
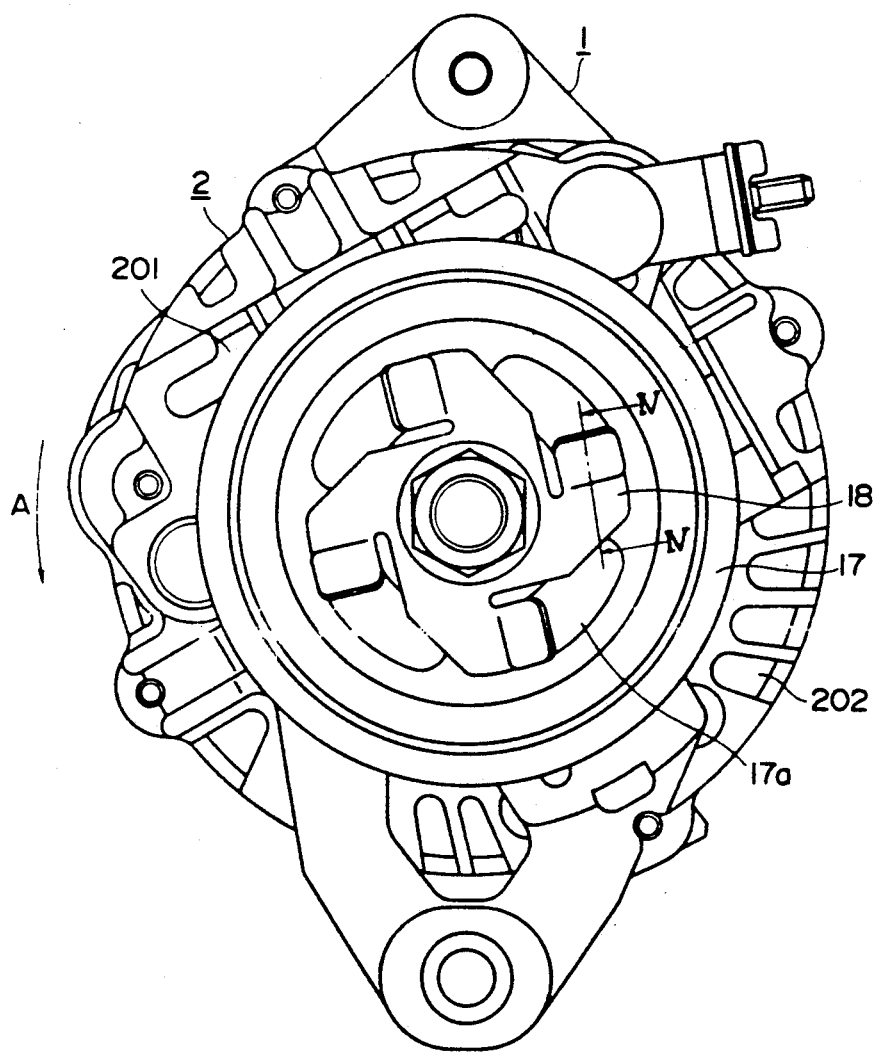
FIG. 3 is a front view of an alternating current generator of the present invention viewed from the pulley side.

FIG. 3 is a front view of an alternating current generator of the invention viewed from the pulley 17 side. In front of the pulley 17, an external axial fan 18 is fixed around the shaft 6 unitedly with the pulley 17. The external axial fan 18 has four blades 18a whose respective tips bend up at a predetermined angle against the front surface of the pulley 17 around the axis of the pulley 17. As shown in FIG. 2, four air-intake vents 17a penetrating the pulley 17 in the axial direction are provided at a radial position corresponding to each tip of the blade 18a of the external axial fan 18. At each air-intake vent 17a, there is further provided a cylindrical guide member 17b projecting from the pulley 17 in the direction from the vent 17a toward the inlet hole 201 of the second cover 2. The shape of the exit side opening of the guide member(s) 17b, (that is, on the inlet hole 201 side), is approximately the same as that of the inlet hole 201.

Figure 4:
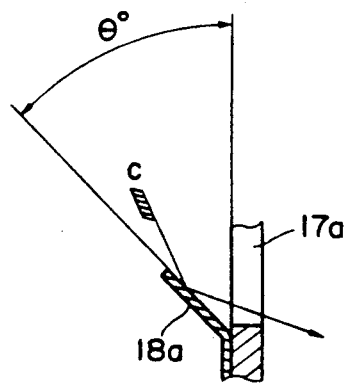
FIG. 4 is a sectional view taken on line IV—IV in FIG. 3.

FIG. 4 is a sectional view of the external axial fan 18 and the air-intake vent 17a taken on line IV—IV in FIG. 3. The tip of the blade 18a of the external axial fan 18 bends back by the angle $\theta$ against the side surface of the pulley 17. The external axial fan 18 has an effect as a fan when the bending angle $\theta$ is within the scope of $10° \leq \theta \leq 90°$. Furthermore, when the bending angle, $\theta = 45° \pm 15°$, the fan has its best effect.

Next, operation of the cooling mechanism of the alternating current generator according to the present invention will be described. The rotation of the engine is transmitted through the pulley 16 to rotate the shaft 6. When the shaft 6 rotates, the internal fans 10a and 10b fixed on both outer surfaces of the rotor 11 rotate. By the rotation of the internal fans 10a and 10b, relatively cold outside air is drawn inside through the inlet holes 101, 201 respectively, and subsequently circulates through the inside as shown by the arrows a and b in the figure.

The drawn air shown by the arrow a is discharged through the discharge hole 102 after cooling the bearing 4, pole core 7, excitation coil 9, and stator coil 3b. The drawn air shown by the arrow b is discharged through the discharge hole 202 after cooling the voltage regulator 15, rectifier 14, pole core 8, excitation coil 9, and stator coil 3b.

The external axial fan 18 rotates unitedly with the pulley 17 in the direction A as shown in FIG. 3. As shown by arrow C in FIG. 4, air is drawn into the vent 17a along the surface of the tip of the blade 18a. The air drawn into the vent 17a tends to scatter in the radial direction of the pulley 17 due to centrifugal force caused by the rotation of the pulley 17. To counteract this effect, the air, as comes out of the pulley 17, is guided to the inlet hole 201 by the guide member 17b. Furthermore, the guide member 17b serves to guide only the relatively cold air, (i.e., air drawn in through pulley 17 via air-intake vent 17a), to the inlet hole 201 by effectively blocking that air which has been heated by moving along the hot surface of the second cover 2 (shown by an arrow b' in FIG. 2).

The relatively cold air drawn in through the inlet hole 201 passes through the inside of the second cover 2 to sufficiently cool the rectifier 14 and the voltage regulator 15. In the alternating current generator of the invention, the incoming air temperature, i.e., the temperature of the air (shown by an arrow b in FIG. 2) at the time of being drawn to the inside through the inlet hole 201, is about 20° C. lower than the corresponding incoming air temperature of the conventional a.c. generator.

Figure 6:
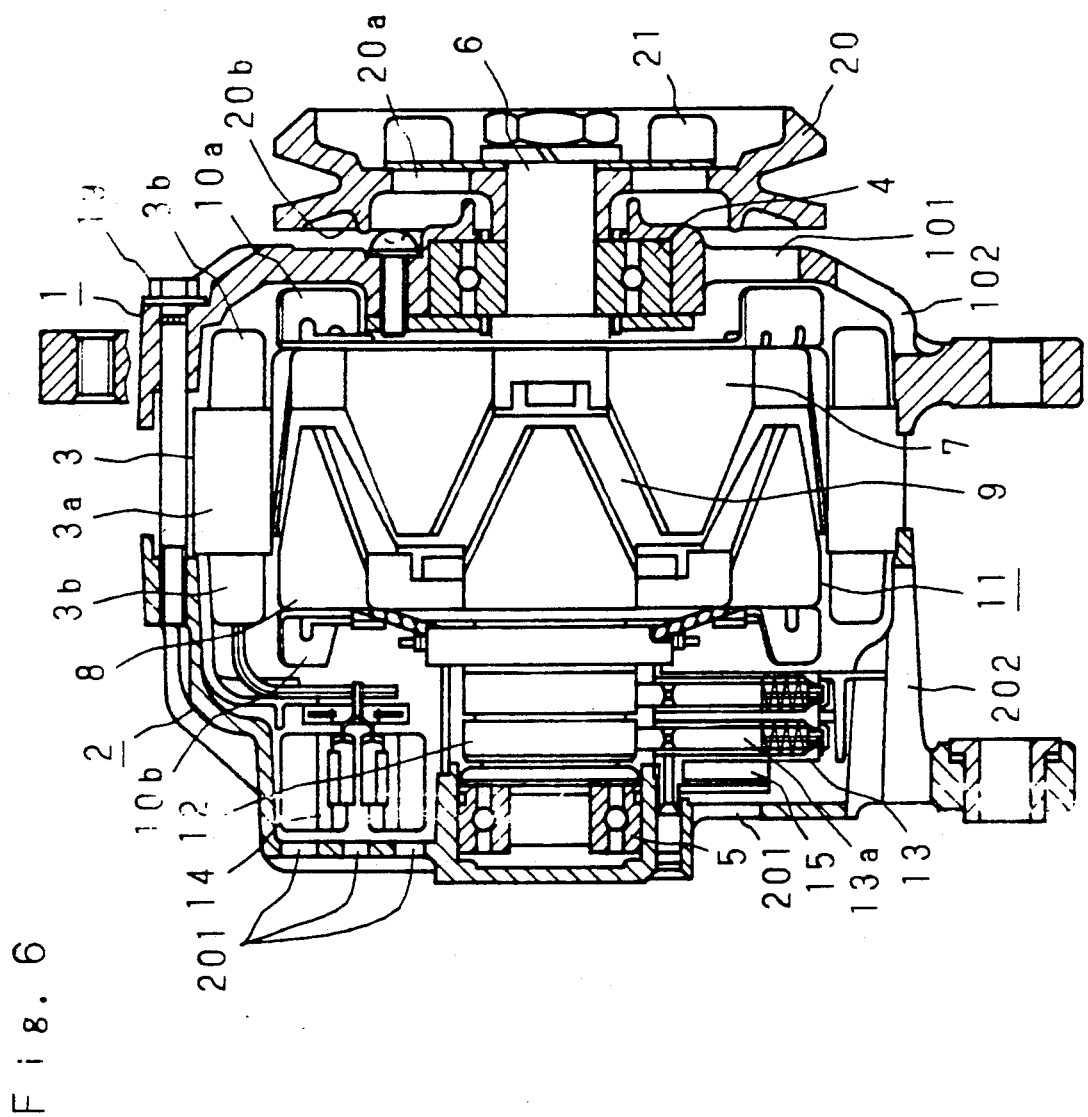

In addition to the aforementioned embodiment wherein an alternating current generator has a pulley 17 provided with a vent 17a, corresponding guide member 17b and external axial fan 18 at the second cover 2 side, an alternative embodiment as shown in FIG. 6, provides a pulley 20 having an air-intake vent 20a, corresponding guide member 20b, and external axial fan 21 on the first cover 1 side. This embodiment is particularly effective for cooling the bearing 4, excitation coil 9 and stator coil 8b.

Figure 5:
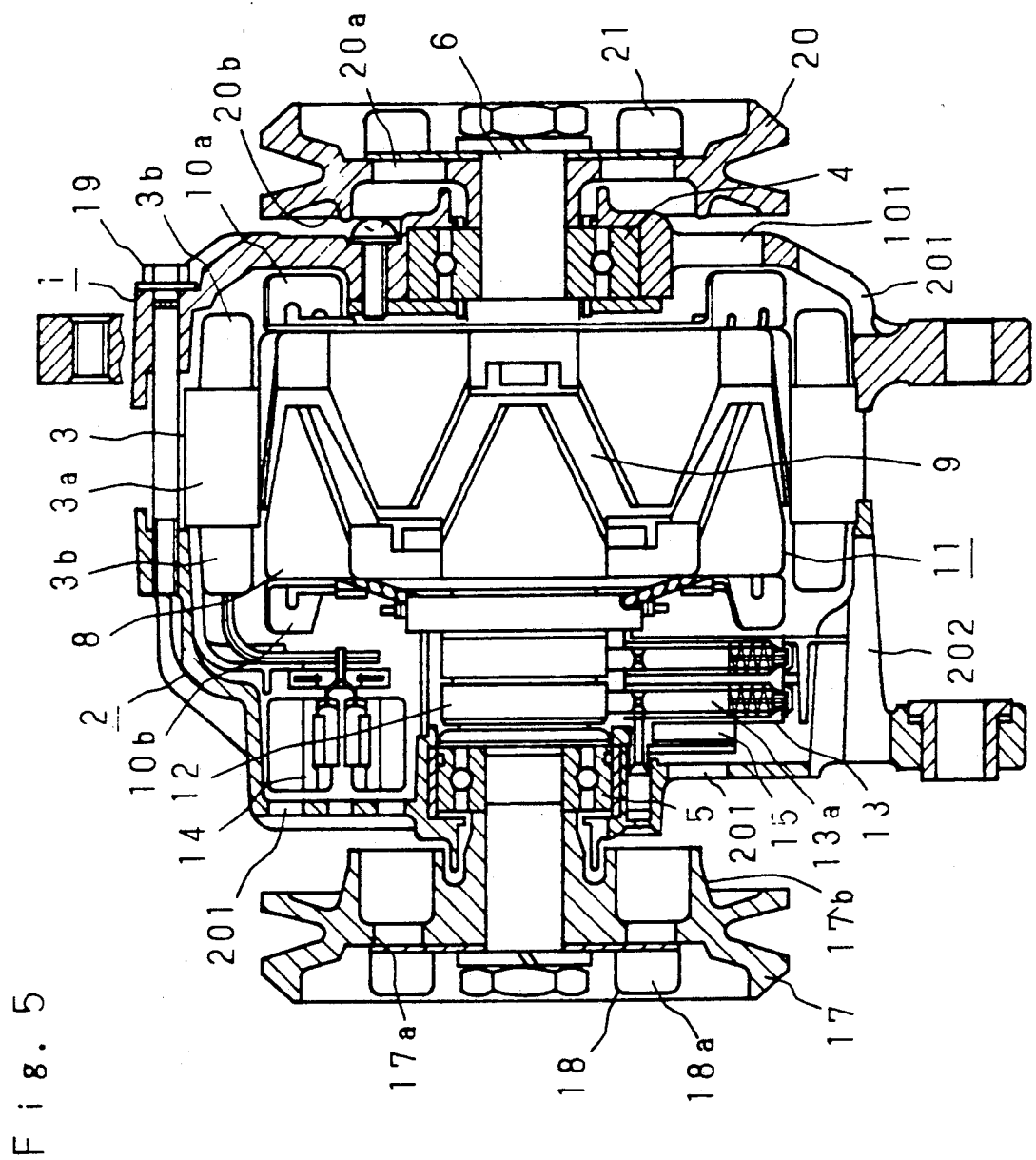
FIG. 5 through FIG. 9 are sectional views showing the construction of other embodiments of an alternating current generator according to the present invention.

FIG. 5 illustrates another embodiment similar to that of FIG. 6, but having two pulleys 17, 20 each pulley respectively having air-intake vents 17a and 20a, corresponding guide members 17b and 20b, and the external axial fans 18 and 21 on the second and first covers 2 and 1, respectively.

In the aforementioned embodiments, explanation has been given to one-groove type pulleys 16, 17 and 20. The invention, however, is also applicable to a plural-groove type (poly-V) pulley. In this case, as the poly-V pulley is relatively long in the axial direction, the air-intake vent penetrating the pulley in the axial direction also serves as a guide, thereby obviating the need for a separately formed guide member.

Figure 7:
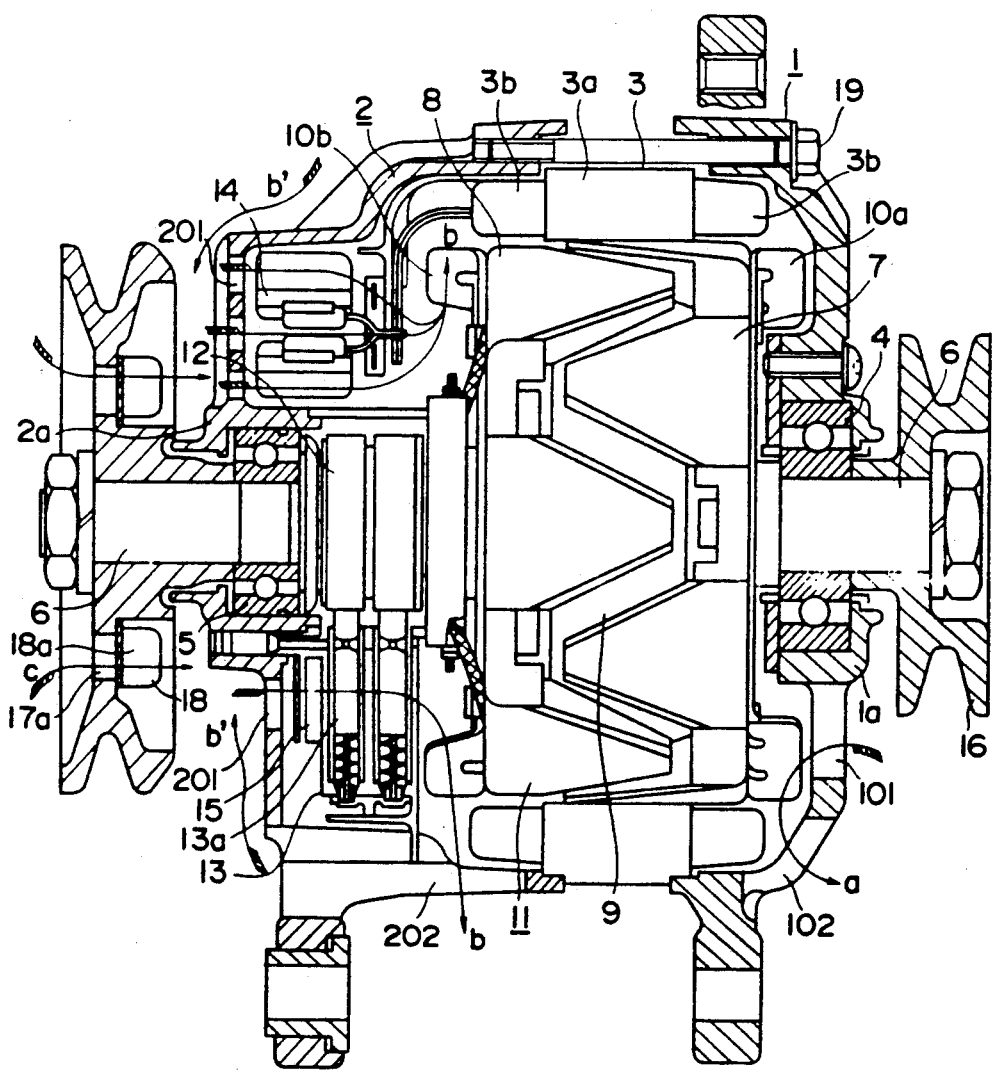
Figure 8:
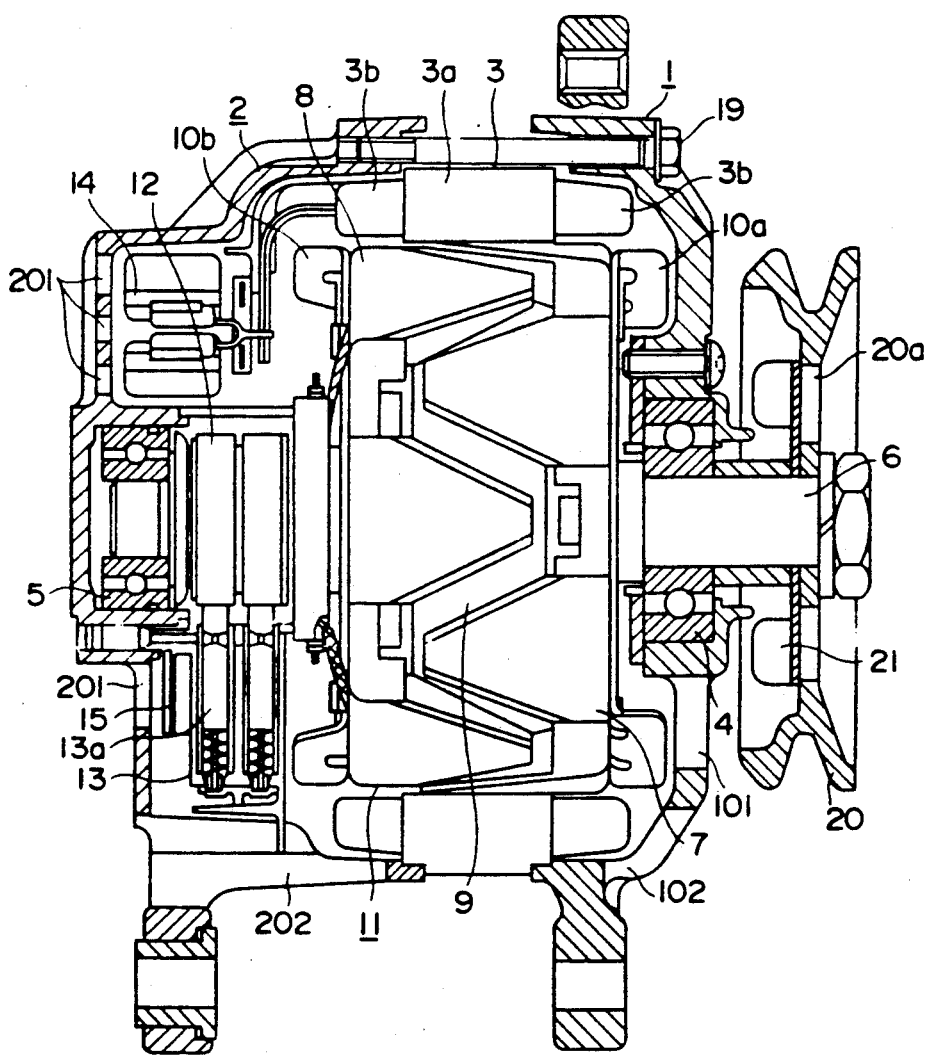
Figure 9:
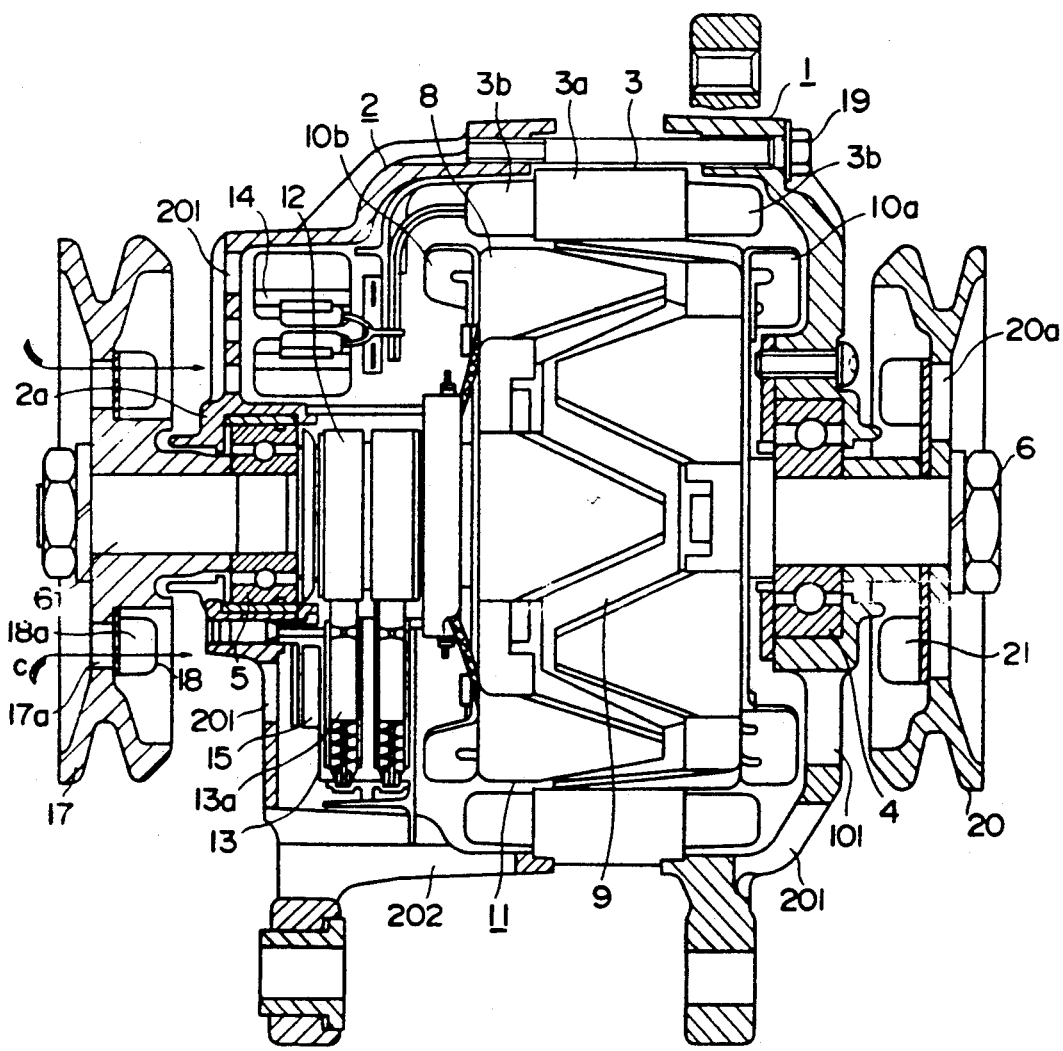

It is also noted that in the aforementioned embodiments shown in FIGS. 2-6, the axial fan 18 or 21 is provided in front of the pulley 17 or 20. It is also possible to provide the external axial fan 18 or 21 between the housing cover and the pulley, such that the fan blades face in toward the rotor. FIG. 7 illustrates an embodiment wherein the external axial fan 18 is provided between the pulley 17 and the second housing cover 2. Similarly, FIG. 8 shows the external axial fan 21 provided between the pulley 20 and the first housing cover 1. FIG. 9 shows an embodiment wherein both pulleys 17 and 20 are provided with a respective external axial fan each of which is positioned between its corresponding pulley and the respective adjacent housing cover.

As this invention may be embodied in several forms without departing from the spirit of its essential characteristics, the present embodiments are therefore illustrative and not restrictive, since the scope of the invention is defined by the appended claims rather than by the description preceding them, and all changes that fall within the meets and bounds of the claims, or equivalence of such meets and bounds thereof, are therefore intended to be embraced by the claims.

What is claimed is:

1. An alternating current generator comprising:
   a rotor fixed on an axis of rotation;
   a stator provided around the outer periphery of said rotor;
   a rectifier for rectifying alternating current induced by said rotor or said stator into direct current;
   a housing consisting of first and second covers (1, 2) for said rotor, stator and rectifier, each of said covers respectively having at least one inlet hole (101, 201) through which enters external air to the inside thereof, and at least one discharge hole (102, 202) through which air exits to the outside thereof;
   first and second internal fans (10a, 10b) coaxially connected on opposite sides of said rotor, inside said housing, for respectively drawing external air into said housing,
   a pulley (17) coaxially connected with said rotor, provided outside of said housing at a first end of said axis of rotation corresponding to said second cover (2), said pulley having air-intake vents (17a) axially extending through the pulley, said vents arranged circumferentially about the axis of rotation of said rotor so as to face toward said inlet holes (201) of said second cover (2); and
   an external axial fan (18) having fan blades (18a), said external fan coaxially and abuttingly connected to said pulley, such that the tips of said fan blades (18a) are at a radial position corresponding to the radial position of said air-intake vents, for drawing external air in through said air-intake vents (17a) in a direction toward said inlet holes (201).

2. An alternating current generator as set forth in claim 1, wherein said pulley is provided between said external axial fan (18) and said housing.

3. An alternating current generator as set forth in claim 1, wherein said external axial fan (18) is provided between said pulley and said housing.

4. An alternating current generator as set forth in claim 1, wherein said pulley and said external axial fan (18) are provided at one end of the axis of rotation of said rotor.

5. An alternating current generator as set forth in claim 1, further comprising a second pulley (20) coaxially connected with said rotor, provided outside of said housing at a second end of said axis of rotation corresponding to said first cover, said second pulley having associated therewith second air-intake vents (20a) axially extending through said second pulley, said second air-intake vents (20a) arranged circumferentially about the axis of rotation of said rotor so as to face toward the inlet holes (101) of said first cover (1); and a second external axial fan (21) having second fan blades, said second external axial fan coaxially and abuttingly connected to said second pulley, such that the tips of said second fan blades are at a radial position corresponding to the radial position of said second air-intake vents (20a) for drawing external air in through said second vents.

6. An alternating current generator as set forth in claim 1, further comprising:
at least one cylindrical guide member (17b) formed on said pulley at each air-intake vent (17a) for directing external air drawn in by said first internal fan (10a) toward said inlet holes (201) of said second cover (2).

7. An alternating current generator as set forth in claim 6, wherein said pulley is provided between said axial fan and said housing.

8. An alternating current generator as set forth in claim 6, wherein said axial fan is provided between said pulley and said housing.

9. An alternating current generator as set forth in claim 6, wherein said pulley, axial fan and guide member(s) are provided at one end of the axis of rotation of said rotor.

10. An alternating current generator as set forth in claim 6, further comprising a second pulley (20), coaxially connected with said rotor, provided outside of said housing at a second end of said axis of rotation corresponding to said first cover (1), said second pulley having associated therewith second air-intake vents (20a) axially extending through said second pulley (20), said second air-intake vents (20a) arranged circumferentially about the axis of rotation of said rotor so as to face toward the inlet holes (101) of said first cover (1);
a second external axial fan (21) having second fan blades, said second external axial fan coaxially and abuttingly connected to said second pulley (20), such that the tips of said second fan blades are at a radial position corresponding to the radial position of said second air-intake vents (20a) for drawing external air in through said second vents;
and further having at least one cylindrical guide member (20b) formed on said second pulley (20) at each of said second air-intake vents (20a) for directing external air drawn in by said second external axial fan (21) toward the inlet holes (101) of said first cover (1).

11. An alternating current generator as set forth in claim 6, wherein the shape of the exit side opening of said guide members is approximately the same as the shape of said inlet holes.

* * * * *